United States Patent [19]

D'Agostino et al.

[11] Patent Number: 4,500,396

[45] Date of Patent: Feb. 19, 1985

[54] COPPER RECOVERY PROCESS

[76] Inventors: Vincent F. D'Agostino, 4 Greenland Dr., Huntington Station, N.Y. 11746; Joseph Y. Lee, 911 Hawkins Ave., Lake Grove, N.Y. 11755; Stephen Zapisek, 12 Vandorn St., Huntington Station, N.Y. 11746; George Schore, 45 Hillpark Ave., Great Neck, N.Y. 11021

[21] Appl. No.: 574,048

[22] Filed: Jan. 26, 1984

[51] Int. Cl.³ ............................................. C25C 1/12
[52] U.S. Cl. .................................... 204/107; 204/106; 204/108; 204/159.16; 8/116.1; 8/DIG. 18; 210/684; 210/685; 423/24; 423/DIG. 14; 521/30; 521/31
[58] Field of Search ............... 204/159.16, 107, 106, 204/108; 521/30, 31; 8/116.1, DIG. 18; 423/24, DIG. 14; 210/684, 685

[56] References Cited

U.S. PATENT DOCUMENTS

| 4,080,418 | 3/1978 | Carlberg | 423/24 |
|---|---|---|---|
| 4,092,250 | 5/1978 | Sand et al. | 521/30 |
| 4,230,549 | 10/1980 | D'Agostino et al. | 204/159.17 |
| 4,260,740 | 4/1981 | Carrington et al. | 536/63 |
| 4,329,210 | 5/1982 | Merchant et al. | 204/107 |
| 4,332,916 | 6/1982 | Thill | 521/30 |
| 4,339,473 | 7/1982 | D'Agostino et al. | 427/44 |
| 4,386,006 | 5/1983 | Harrington | 521/30 |

Primary Examiner—R. L. Andrews
Attorney, Agent, or Firm—Kenyon & Kenyon

[57] ABSTRACT

A method is described for metal recovery from basic ammoniated metal solutions by means of a weakly-acidic cation-exchange material comprising a polymeric felt incorporating radiation-grafted monomers comprising carboxylic acid functional groups.

24 Claims, No Drawings

COPPER RECOVERY PROCESS

Printed circuit boards are widely used in the electronic industries. There are two major processes to make these boards, the subtractive and the additive process. In the subtractive process, copper is laminated or plated on to a fibreglass board. The electronic circuit is imaged on the copper, protected by a masking material, and then the unprotected area of copper is etched away. In the additive process, the electronic circuit is imaged on the treated fibreglass board. However, instead of the circuit area being masked and protected, the non-circuit area is masked and protected. Copper is then electrolessly plated on the unmasked area which makes up the circuit. At present, most of the printed circuit boards are manufactured by the subtractive process, which involves an etchant. Acid etchants, persulfate etchants, and ammoniacal etchants are commonly used. Approximately 70 to 80% of the etchant baths are of the ammoniacal copper etchant type. In these baths, copper is typically present as an ammoniated complex of a copper salt, such as the tetracoordinate ammonia complex of a copper salt, such as cupric chloride [$Cu(NH_3)_nCl_2$] wherein n=1–4, typically about 4.

To maintain the etchant bath in optimal conditions, the copper concentration in the bath must typically be kept between 75–150 g/liter. Above the optimal concentration, precipitates will form in the bath, and below it, the etchant rate will decrease.

It is also necessary to control the copper concentration in drag-outs and rinse water from the spent etchant baths, so that these metal-containing wastes may be discharged into the environment in accord with EPA, state or local standards.

Electrolytic recovery methods are employed to recover copper from such spent solutions. However, electrolytic recovery requires large amounts of energy both to capture and recover the copper and furthermore electrolytic processes are not practical for dilute solutions of low conductivity. Copper is also removed from spent aqueous solutions by precipitation, e.g. with strong alkali. The resultant metal-containing sludge also presents serious disposal problems.

Therefore, it is an object of the present invention to provide a polymeric, ion-exchange material in the form of a filter cartridge which will efficiently complex and remove low concentrations of metals from aqueous solutions and which can easily be regenerated to an active, metal-free form.

It is a further object of the present invention to provide a method for recovering metallic cations from alkaline ammoniacal plating baths.

It is a further object of the present invention to provide a method for producing pure copper metal from etching bath effluents without contamination by metallic sludge by-products.

BRIEF DESCRIPTION OF THE INVENTION

The objects of the present invention are achieved by contacting alkaline, aqueous solutions comprising cationic metal ammonia complexes with weakly-acidic cation-exchange materials. Typical metal compounds which can exist as ammoniated complexes in aqueous solution include the salts of nickel, cobalt, zinc, cadmium and silver, although the $Cu(NH_3)_nCl_2$ complex, wherein n=1–4, and is typically 4, is the most widely-employed in etching baths. Other counteranions such as bromine, iodine, sulfate, carbonate and the like may be employed in place of chloride ions associated with the metal cation. The cation-exchange materials are formed by radiation grafting polymeric felts with monomers comprising carboxylic acid functional groups and subsequently converting the bound carboxylic acid groups to the carboxylate salt form with base. The acid salt form of the grafted felts may be usefully employed to recover ammoniated metal cations from basic etchant baths or drag-out solutions but, preferably, the carboxylates are reconverted to the free acid groups prior to exposing the felt to the metal cation-containing solutions. The complex which results when the carboxylate anion interacts with the positively-charged ammoniated metal cation is easily broken by washing the complexed ion exchange material with an aqueous acid or with an ammonium chloride-ammonium hydroxide solution. The metal may then be recovered from the wash solution by known electroplating methods and the ion-exchange material may be washed with water and reused.

DETAILED DESCRIPTION OF THE INVENTION

The ion-exchange materials of the present invention are prepared by radiation-grafting monomers comprising one or more carboxylic acid groups to a substrate comprising a fibrous polymeric felt. Techniques useful for radiation grafting hydrophilic monomers, including the preferred acrylic and methacrylic acids, to inert polymeric base films to form separator membranes for electrochemical cells are disclosed in U.S. Pat. Nos. 4,339,473 and 4,230,549, the disclosures of which are incorporated by reference herein.

Preferred polymeric felts for use as the ion exchange material substrate include the 2.7 mil nonwoven fibrous polypropylene felt commercially-available as No. 1488 from Kendall Mills, Walpole, Mass. Other porous woven or nonwoven polymeric felts or sheets would be suitable for use as substrates which retain a porosity after grafting sufficient to permit an effective flow rate therethrough of the feed and elution solutions, as discussed hereinbelow. Suitable polymeric felt fibers would therefore also include those of nylon, cellulosics, polyethylene, polytetrafluoroethylene and mixtures thereof.

The grafted cartridge substrates are produced by rolling up the nonwoven sheet with an absorbent paper inner layer and immersing the roll in a solution of the monomer in a suitable solvent. Suitable organic solvents for the grafting monomers are the chlorinated hydrocarbons such as methylene chloride, carbon tetrachloride, 1,1,1- or 1,1,2-trichloroethane; aromatic solvents such as toluene or xylene, or mixtures thereof. In the case of water-soluble monomers, solvent systems consisting substantially of water are preferred.

The monomers useful to impart ion-exchange activity to the polymeric substrates when grafted thereto will include a carboxylic acid functional group. Preferably the carboxylic acid group will be linked to one or more vinylic or ethylenic groups which couple into the polymeric matrix via free radical reactions when the groups are excited by incident radiation. The most preferred carboxylic acid group-containing monomers are acrylic and methacrylic acids. The amount of monomer employed in the grafting procedure is in the range of from about 5 to abut 60% by volume based on the total volume grafting solution. Other carboxylic acid-containing monomers may also be used, including itaconic acid, fumaric acid, maleic acid, mesaconic acid, cinnamic acid, citraconic acid, other alpha- or beta-lower alkyl acrylic acids and the like.

Water-soluble iron and copper salts are preferably included in the aqueous solvent systems in amounts sufficient to inhibit homopolymerization of the monomer during the grafting process. Illustrative of such salts are water-soluble ferrous salts such as ferrous sulfate, ferrous nitrate and the like, and the cupric salts such as cupric sulfate, cupric chloride, cupric nitrate, cupric acetate and the like.

After immersion in the solution of the monomer, the polymeric felt is irradiated by a source of ionizing radiation such as that provided by a Co-60 source, until the felt is grafted to the extent of about 10–1500%, preferably to about 100–1000%.

The grafted felt substrate is then removed from the monomer bath, washed free of any homopolymer with water and/or dilute mineral acid, e.g., sulfuric or hydrochloric acid. The carboxylic acid groups are then activated toward ion-exchange by washing the grafted substrate with dilute aqueous base so as to convert the carboxylic acid groups into the corresponding carboxylate salts. Suitable bases for the acid salt-formation step include sodium, potassium and ammonium hydroxide and the like. Although the acid salt form of the grafted felt may be directly used to capture ammoniated metal cations from basic aqueous solutions, the grafted felts are preferably reconverted to the free acid ($CO_2H$) form prior to use. This step is typically accomplished by washing the salt form of the grafted felt with excess dilute aqueous mineral acid, e.g. with a hydrochloric or sulfuric acid solution having a pH of less than or equal to about one.

The ion-exchange substrate thus prepared may be identified as a weakly-acidic cation-exchange material which functions to remove metal cations, i.e., tetraammoniated cupric cations from basic aqueous solutions by complexation. If the carboxylic acid moieties are not exposed to the copper-containing solutions in the salt form, the acid salt form of the ion exchange substrate is produced in the basic bath and functions to effectively capture copper cations. Once complexed, the $Cu(NH_3)_4^{+2}$ cations may be eluted from the cartridge material by treatment with excess aqueous acid (optimal pH of about 1 or less).

Therefore, by means of exposure to the ion-exchange materials of the present invention, copper and other metal-ammonia complexes may be efficiently removed from basic solutions containing contaminants such as buffers, other metal ions and the like, and eluted into an acidic solution substantially free of said contaminants. Subsequently, metallic copper may be recovered in a state of high purity in a relatively brief period of time by electrodeposition of the copper onto a suitable metallic cathode by techniques well known in the plating art. The acidic form of the ion-exchange material is then washed with water and further copper-containing solutions processed.

Typically, the grafted felt is formed into a filter cartridge by winding grafted felt strips onto a cylindrical core of an inert material which is then inserted into a pressure filter housing and capped with an inlet port at one end and at an outflow port at the other. It has been found that ion-exchange cartridges prepared according to the present invention can capture greater than 99% of the copper in a solution containing as little as about 1 ppm–500 ppm copper in one pass at a pass-through rate of up to 15 l/min. at a capture solution temperature of about 15°–25° C. When prepared in this manner, filter cartridges may be designed which will capture greater than 99.5% of the copper present in a solution which contains 1–500 ppm of copper in one pass at a rate of about 10–11 l/min. Two such cartridges packed with about 60 linear feet each of 20 mil methacrylic acid-grafted polypropylene felt of a 20 in. width will exhibit a capacity of up to about 200 g of copper metal with an endpoint bypass concentration in the capture solution of no more than about 1.0 ppm of copper, preferably about 0.1–0.3 ppm.

Although the ammoniated copper cations are rapidly taken out of the basic capture solution, they also may be rapidly removed from the ion-exchange cartridge by passing an acidic aqueous solution through the filter bed. Preferably, the pH of the (recovery solution) eluate is adjusted to about one or less with a strong mineral acid such as sulfuric acid, hydrochloric acid, phosphoric acid or the like, passed through the cartridge and circulated through a suitable plating cell at a rate of about 7–15 l/min. However, it has also been found that ammoniated copper cations may be eluted from the ion-exchange cartridge with basic aqueous ammonium chloride and ammonium hydroxide. Preferably, the ammonium chloride is present at a concentrations of about 4–6M, most preferably about 4.7–5.6M and the ammonium hydroxide is present at a concentration of about 0.05–1M, preferably about 0.1–0.5M. Following the elution step the felt is washed with water, i.e. deionized water, before the next capture cycle is commenced.

A typical plating cell for recovery from a cartridge assembly with a 30–40 liter capacity would itself hold 30–40 liters of electrolyte. The plating cell would be equipped with a rotating stainless steel cathode, a platinum-niobium anode and operated at an electrolyte temperature of about 15°–25° C. at a voltage of about 3–10 volts and a current of up to about 100 amps. When operated in this fashion, useful plating cells will recover at least about 97.0% of the captured copper in no more than about 3 hours, during which time the copper concentration of the eluate-electrolyte will be lowered to about 0.1–15 ppm, preferably to about 1–5 ppm. The copper recovered by this process is typically greater than 99% pure. At this purity, further purification steps are unwarranted, a fact which enhances the economic potential of the present process.

As discussed hereinabove, it is expected that the present ion-exchange materials and process will be effective for the recovery of other metals which form useful ammoniated metal salt complexes including silver, nickel, cobalt, zinc, and cadmium.

Thus, in use, a typical copper recovery apparatus may comprise two ion-exchange cartridges prepared as described above and arranged in a series. Nineteen hundred liters of etching rinse solution containing about 90–120 mg/l copper as basic tetraammonia cupric chloride are circulated through the columns at a pump rate of about 9–15 l per minute. The bypass (ppm copper in the recovery solution eluate) when the columns are holding about 175 g of copper is about 0.075–0.2 ppm; at about 200 g the bypass is about 0.5–0.6 ppm.

Recovery of about 97–99% of the captured copper as copper metal in the plating cell requires about 1.5–3.0 hours using a 1.0–2.0M aqueous sulfuric acid recovery solution of about pH 1.0 with a final copper eluate concentration of no more than about 10.0 ppm. The recovered copper assays are 99.0-plus percent pure by atomic absorption spectrometry.

If desired a second series of cartridges may be connected to a reservoir of the copper-containing solution, to allow continuous processing of a large amount of solution. Thus, while the copper in the first set of columns is being eluted and plated out, the flow of the copper-containing capture solution can be switched over to the second set of columns. After the copper has been recovered from the first set of columns and the filter regenerated, the flow can be returned to the first set of columns so that the capture of the copper cations and the recovery of copper metal proceeds continuously.

The invention will be further described by reference to the following detailed examples.

EXAMPLE I

Copper Filter Preparation

Following the general procedures disclosed in U.S. Pat. No. 4,230,549, an ion-exchange cartridge is prepared from 2.7 mil nonwoven polyporpylene felt (commercially available as 1488 from Kendall Mills, Walpole, Mass.) as follows: The felt is rolled up with an absorbent paper interlayer and the roll is immersed in a monomer solution consisting of 30% by volume methacrylic acid and 70% by volume water, plus 1% by weight of $CuSO_4.5H_2O$. The felt solution combination is then irradiated to 400% graft with a total dose of 0.50 Mrad at a dose rate of 9000 rads/hr. using a Co-60 radiation source. The membrane is washed free of homopolymer with water and then converted to the salt form by washing with excess 4% KOH and then reconverted to the free acid form by washing with excess 1.5M sulfuric acid to form a weak cationic exchanger which was used in the following examples. The grafted felt has a thickness of 15 mil.

EXAMPLE II

Copper Recovery

The filter prepared according to the procedure of Ex. I was prepared by winding 60 feet of 20" wide membrane around a 0.75"×2.0' long polyvinyl chloride core, which was then inserted into a 6.0 inch by 2.5 foot polyvinyl chloride pressure filter housing to form one column unit. Two such columns were placed horizontally in a series with a reservoir and a sump, representing a total solution holding capacity of 30 liters. The system was filled with water and adjusted to 0.044M in $NH_4Cl$ by addition of solid ammonium chloride, and to a pH of 9.0 with aqueous $NH_4OH$. A 720 ml. solution of 1.08M $Cu(NH_3)_4Cl_2$ containing 72 g of copper metal was cycled from a holding tank through the system at a rate of 11 l/min. After one pass through the two column system, the concentration of copper in the eluate was 0.13 ppm, representing a copper capture by the columns of 71.99 g, and a total copper capture of 99.99%.

The columns were drained and water was run through the system and into a 18 l plating cell equipped with a 47.1 sq. in. rotating stainless steel cathode and a platinum-coated niobium anode and filled with water. A solution of 3.0 l of 18M $H_2SO_4$ is added to the cell to adjust the electrolyte to about 10% b volume of $H_2SO_4$ (pH less than or equal to about 1 at room temperature). The acidic electrolyte is then cycled through the columns at a rate of 3–15 l/min. while the plating cell is operated at 5.0 volts, 30 amps. After 155 minutes, 71.80 g of copper of 99% purity plated out on the cathode, representing a recovery of 99.7%. The concentration of copper in the circulating 10% by volume $H_2SO_4$ solution had dropped to 10 ppm.

Table I summarizes the results of four additional runs employing the cation exchange filters of this invention to recover copper metal from commercial etching solutions.

TABLE I

| | | COPPER CAPTURE AND RECOVERY PROCEDURE | | | | | | | |
|---|---|---|---|---|---|---|---|---|---|
| EX.[3] | COPPER SOLUTION | INPUT RATE | RUN E.T. | TOTAL WT. OF COPPER IN | TOTAL COPPER CAPTURED | % TOTAL COPPER INPUT CAPTURED | AVG. BYPASS (ppm)[5] | RECOVERY % | RECOVERY[4] RUN TIME |
| 3 | MacDermid[1] XD-2050-T | 13.3 l/min. | 90 min. | 45.9 g | 45.892 g | 99.983% | 0.28 ppm | 98.26% | 92 min. |
| 4 | MacDermid[1] XD-2050-T | 13.3 l/min. | 70 min. | 72.0 g | 71.996 g | 99.995% | 0.13 ppm | 97.5% | 144 min. |
| 5 | Hunt[2] Endura-Etch | 11.4 l/min. | 110 min. | 90.0 g | 89.984 g | 99.982% | 0.54 ppm | 99.0% | 180 min. |
| 6 | Hunt[2] Endura-Etch | 11.4 l/min. | 94 min. | 81.0 g | 80.997 g | 99.996% | 0.11 ppm | 98.27% | 162 min. |

[1]Available from MacDermid, Inc., Waterbury, CT. Copper is present as $Cu(NH_3)_4Cl_2$ at a copper conc. of 100 g/l.
[2]Available from Philip A. Hunt Chemical Corp., Palisades Park, N.J. Copper is present as $Cu(NH_3)_4Cl_2$ at a copper conc. of 112 g/l.
[3]Run #3 employed a 6" × 2.5' polyvinyl chloride column containing a ¾" core of PVC which was wound with 60 ft. of 20" wide, 20 mil thick polypropylene felt grafted to the extent of 400% with 3.5 M methacrylic acid in water (grafting dose 0.5 Mrad). Runs 4–6 used two such columns arranged in a series. The felt is available under the designation #1488 from Kendall Mills, Walpole, Mass.
[4]Copper was recovered as free metal by eluting $Cu(NH_3)_4^{+2}$ with 9.8 g/l aqueous $H_2SO_4$ and by plating it onto a 47.1 sq. in. cathode made of stainless steel and by rotating at a speed of 2000 linear ft. per minute in a 30 l plating cell with a Pt/Nb anode operated at 6.1 volts, 30 amps, 22° C.
[5]Copper concentration in eluent was assayed by the procedure of atomic absorption spectrophotometry.
[6]Recovered copper purity was assayed by the procedure of atomic absorption spectrophotometry and was at least 99.0% in each case.

Table I demonstrates the efficacy of the ion-exchange materials of the present invention in recovering copper of a high purity from commercially-available etching baths without the need for any pretreatment of the solutions to remove chelating agents, additional metal components and the like. Thus, the copper recovery columns could readily be used to adjust the copper concentration of etching baths containing high copper concentrations. The column units of Exs. 2–6 also function to effectively recover copper from basic dichlorocupric tetrammonium solutions which contain as little as 1–500 ppm copper. Thus, the ion-exchange materials of the present invention would be expected to be useful to recover copper from spent etching solutions which have been pretreated to remove a major proportion of the copper content by other means.

The invention has been described with reference to various specific and preferred embodiments and techniques. However, it should be understood that many variations and modifications may be made while remaining within the scope and spirit of the invention.

We claim:

1. A method of metal recovery comprising;
   (a) forming a weakly-acidic cation-exchange material by radiation-grafting vinylic or ethylenic monomers comprising carboxylic acid functional groups to a polymeric felt substrate to the extent of 10–1500%;
   (b) converting the carboxylic acid groups to the corresponding carboxylate salt groups; and
   (c) contacting the cation-exchange material with an alkaline aqueous solution comprising ammoniated metal cations so as to form a complex between the cations and the carboxylate groups, thereby removing the cations from solution.

2. The method of claim 1 further comprising:
   (d) decomplexing said ammoniated cations by contacting the cation-exchange material with an aqueous acid; and
   (e) recovering the metal from the aqueous acid by electrodeposition.

3. The method of claims 1 or 2 wherein the metal is selected from the group consisting of nickel, silver, copper, cadmium and cobalt.

4. The method of claims 1 or 2 wherein the carboxylate salt groups are reconverted to carboxylic acid groups prior to step (c).

5. The method of claim 1 wherein the metal is copper and the ammoniated metal cations comprise (tetraammonia)cupric cations.

6. The method of claim 5 further comprising:
   (d) eluting the complexed ammoniated copper cations by contacting the cation-exchange material with an aqueous solution comprising ammonium chloride and ammonium hydroxide; and
   (e) rinsing the cation exchange material with water.

7. The method of claim 4 wherein the monomer comprises acrylic acid or methacrylic acid and the polymeric felt comprises a nonwoven polypropylene felt.

8. The method of claim 2 wherein the aqueous acid comprises sulfuric acid or hydrochloric acid.

9. A method of copper recovery comprising:
   (a) forming a weakly-acidic cation-exchange material by radiation-grafting acrylic acid or methacrylic acid to a polymeric felt substrate to the extent of 100–1000%;
   (b) converting the grafted acids to the acid salts;
   (c) reconverting the acid salts to the free acids; and
   (d) contacting the resin with a basic solution comprising (tetra-ammonia)cupric chloride so as to form a complex between the acid salts and the cupric cations, thereby removing the cations from solution.

10. The method of claim 9 further comprising:
    (e) decomplexing the cation complex by contacting the cation-exchange material with an aqueous solution of sulfuric acid; and
    (f) removing the copper from the aqueous acid by electrodeposition.

11. The method of claims 9 or 10 wherein the polymeric felt comprises a nonwoven polypropylene felt.

12. The method of claim 9 further comprising:
    (d) decomplexing the cupric cation complex by contacting the cation-exchange material with an aqueous solution comprising about 4–6M ammonium chloride and about 0.1–0.5M ammonium hydroxide.

13. A weakly acidic cation-exchange material adapted for metal recovery from basic aqueous solutions comprising a polymeric felt radiation-grafted to the extent of about 10–1500% with a vinylic or ethylenic monomer comprising a carboxylic acid functional group, said functional group being present in said grafted felt as the carboxylic acid salt.

14. A weakly acidic cation exchange material adapted for metal recovery from basic aqueous solutions comprising a polymeric felt radiation-grafted to the extent of about 10–1500% with a vinylic or ethylenic monomer comprising a carboxylic acid functional group, said functional group being present in said grafted membrane as the free carboxylic acid, wherein said free acid group is formed by treating the acid salt form of the grafted monomer with aqueous acid.

15. The material of claims 13 or 14 wherein the monomer comprises acrylic acid or methacrylic acid.

16. The material of claims 13 or 14 wherein the extent of grafting is about 100–1000%.

17. The material of claim 15 wherein the felt comprises a nonwoven polypropylene felt.

18. An ion-exchange filter cartridge comprising the grafted felt of claims 13 or 14.

19. A method of metal recovery comprising:
    contacting a weakly acidic cation exchange material with a basic aqueous solution comprising ammoniated metal cations so as to form a complex between the cations and the material, thereby removing the cations from the solution; said material comprising a polymeric felt substrate radiation-grafted to the extent of 10–1500% with a vinylic or ethylenic monomer comprising a carboxylic acid functional group.

20. The method of claim 19 further comprising:
    (a) decomplexing the complex by contacting the cation-exchange material with an aqueous acid; and
    (b) recovering the metal from the aqueous acid by electrodeposition.

21. The method of claims 19 or 20 wherein the metal is copper and the ammoniated metal cations comprise $(NH_3)_4CuCl_2$.

22. The method of claims 19 or 20 wherein the monomer comprises acrylic acid or methacrylic acid and the polymeric felt comprises a nonwoven polypropylene felt.

23. The method of claim 20 wherein the aqueous acid comprises hydrochloric acid or sulfuric acid.

24. The method of claims 19 or 20 wherein the felt substrate comprises a polymer selected from the group consisting of polypropylene, nylon, polyethylene, polytetrafluoroethylene and cellulosics.

* * * * *